(12) United States Patent
Wiehler

(10) Patent No.: US 6,850,915 B1
(45) Date of Patent: Feb. 1, 2005

(54) METHOD FOR CONTROLLING DISTRIBUTION AND USE OF SOFTWARE PRODUCTS WITH NET-WORK-CONNECTED COMPUTERS

(75) Inventor: Gerhard Wiehler, Eichenau (DE)

(73) Assignee: Siemens Aktiengesellschaft, Münich (DE)

( * ) Notice: Subject to any disclaimer, the term of this patent is extended or adjusted under 35 U.S.C. 154(b) by 0 days.

(21) Appl. No.: 09/486,942
(22) PCT Filed: Aug. 27, 1998
(86) PCT No.: PCT/DE98/02517
§ 371 (c)(1), (2), (4) Date: Jun. 8, 2000
(87) PCT Pub. No.: WO99/12088
PCT Pub. Date: Mar. 11, 1999

(30) Foreign Application Priority Data

Sep. 2, 1997 (DE) .......................... 197 38 325

(51) Int. Cl.[7] ............................................... H04L 9/00
(52) U.S. Cl. .............................. 705/57; 705/51; 705/54; 705/56; 705/58
(58) Field of Search .............................. 705/57, 51, 53, 705/56, 58; 380/3, 4, 25; 717/168–178; 713/176–181

(56) References Cited

U.S. PATENT DOCUMENTS

| | | | | |
|---|---|---|---|---|
| 5,438,508 A | * | 8/1995 | Wyman | 705/26 |
| 5,671,354 A | | 9/1997 | Ito et al. | |
| 5,809,144 A | * | 9/1998 | Sirbu et al. | 705/53 |
| 5,852,666 A | * | 12/1998 | Miller et al. | 713/167 |
| 6,314,409 B2 | * | 11/2001 | Schneck et al. | 380/259 |
| 6,463,418 B1 | * | 10/2002 | Todd | 705/26 |

FOREIGN PATENT DOCUMENTS

| | | | |
|---|---|---|---|
| DE | 40 10 094 C2 | 10/1991 | |
| EP | 0 421 409 A2 | 4/1991 | |
| EP | 816969 A | * 6/1998 | G06F/1/00 |
| WO | WO 95/05050 | 2/1995 | |

OTHER PUBLICATIONS

Virtual Reuse Library: initial implemetation through interoperability. Author (s): Carvell, C.; Qiang Lin–p. 160–4; Publisher : IEEE Comput. Soc Press, Los Alamitos, CA, USA– Publication Date: 1994– USA–ISBN: 0 8186 5705 7.*

* cited by examiner

Primary Examiner—James P. Trammell
Assistant Examiner—Daniel L Greene
(74) Attorney, Agent, or Firm—Schiff Hardin LLP

(57) ABSTRACT

The distribution in controlled by means of central certificates acting as a link between the authorization granted to various users and the right-of-access code allocated to the software products in connection with a special separated control program. The certificates are issued to users on request and intended for calling the wanted software products. Such certificates can be supplemented with distinct control functions. Said functions are executed by the control program, which is supplemented accordingly, especially for recording data on the utilization volume. The invention also relates to the following items: key safety, use of a chip card, integrated copy protection.

16 Claims, 2 Drawing Sheets

METHOD FOR CONTROLLING DISTRIBUTION AND USE OF SOFTWARE PRODUCTS WITH NET-WORK-CONNECTED COMPUTERS

BACKGROUND OF THE INVENTION

1. Field of the Invention

The present invention is directed to a method for data networks wherein data collections or programs are administered as software objects at a central location and, at the request of computers coupled to the data network, are temporarily made available via the data network to the respectively requesting computer for use, whereby the use is coupled to authorizations allocated to the users.

2. Description of the Related Art

Data banks can be driven via networks and data collections thereat can be interrogated. Programs can also be made available on demand via computers connected to data networks. In both instances, the central administration of such software objects offers the advantage that the most recent state of information or the most recent program version is always available. The access is usually bond to corresponding authorizations that can differ greatly with reference to individual software objects. Fees are also often to be paid for the use of the software objects, so that an acquisition of the scope of usage is necessary.

SUMMARY OF THE INVENTION

An object of the invention is to beneficially solve the problems of access authorization and acquisition of usage established in conjunction with a central administration of software objects, and to thereby enable a uniform and flexibly adaptable distribution and use in the entire data network that does justice to the greatest variety of demands.

The point of departure for such a solution is the method for controlling a distribution and use of data collections or programs referred to as software objects at computers coupled via a data network, whereby the software objects are maintained at a central location and made temporarily available on demand for use at the respectively requesting computer, whereby use rights are fashioned in the form of user-specific certificates that are produced in a central administration instance in the data network as link element between the authorizations allocated to the individual users and the authorization identifiers allocated to the software objects;

in every inquiry of a computer logged on at the central administration instance for a software object, the certificates are respectively transmitted user-related to the requesting computer;

after a selection of at least one of the certificates, the selected certificate is verified with a personal data carrier and a transmission of the corresponding software object from the central instance to the requesting computer is initiated;

a separate control program in the requesting computers controls actions relating to the software object on the basis of the usage rights and reports status messages to the central administration instance. In accord therewith, access to the software objects is controlled by centrally produced, user-specific certificates in conjunction with a separate control program. As a result of the central administration of the usage rights established therewith, changes in access rights of the users can be reacted to very flexibly and a uniform distribution mechanism can be employed net-work-wide.

The certificates and the separate control program also open up the possibility of realizing further functions in a uniform way, in that these are supplemented by further control parameters or, respectively, corresponding program functions. According to one development, thus, a further software object can be automatically requested and reloaded during a program run when one of the existing certificates refers to this further software object.

The acquisition of the scope of usage can also be controlled in a simple way by the supplemented, separate control program dependent on corresponding particulars in the certificate, whereby various possibilities of acquisition are established.

A further advantageous development derives by reporting the data about the usage acquisition to a central administration instance in the network, so that information about the software objects utilized and their scope of usage can be established at any time. The point in time and the scope of the message can be differently fashioned such that the answer back ensues after the expiration of the validity duration of a certificate and comprises the object-related acquisition data belonging thereto, or the answer back ensues after the expiration of the validity duration for the separate control program and comprises all existing acquisition data.

The method can also be expanded to networks having a plurality of independent administration instances for software objects.

A further advantage is comprised therein that the method can work with various security standards. It is expedient when all connection set ups in the data network and transmissions ensue protected by keys that are expediently stored on a user-related chip card. The employment of a chip card as a data carrier also does not bind the user to a local work station; on the contrary, he can become active proceeding from every computer in the network. The chip card is thereby also expediently employed for the acquisition of the data about the scope of usage.

Further, the copying protection of software objects can be assured in a simple way by corresponding supplementation of the appertaining certificates and of the separate control program.

Further, the control program can check whether requested software objects are already available on the requesting computer and, given a positive result, can initiate the local offering of the software object. The repeated transmission of the software object to the computer can thus be suppressed and performance can be enhanced.

Given central administration of software and rights, the invention enables a decentralized software use overall. It is based on technologies that assure scalable security and can meet the most stringent security demands. The invention also resolves the distribution and acquisition of usage of valid software versions as well as the largely automatic deletion of versions that are no longer required. Information about the software objects utilized as well as about their use is possible at any time. A network-wide acquisition of the data about the scope of usage can be periodically carried out and can be parameterized, for example monthly. Users can load and employ software at arbitrary computers connected to the network. A central administration enables the network-wide adherence to distribution and usage rules. Nonetheless, the user can be granted the freedom to undertake the settings in conformity with the individual conditions of his work station.

BRIEF DESCRIPTION OF THE DRAWINGS

Let details of the invention be explained in greater detail below with reference to an exemplary embodiment shown in the drawing.

DETAILED DESCRIPTION OF THE PREFERRED EMBODIMENTS

Figure 1:
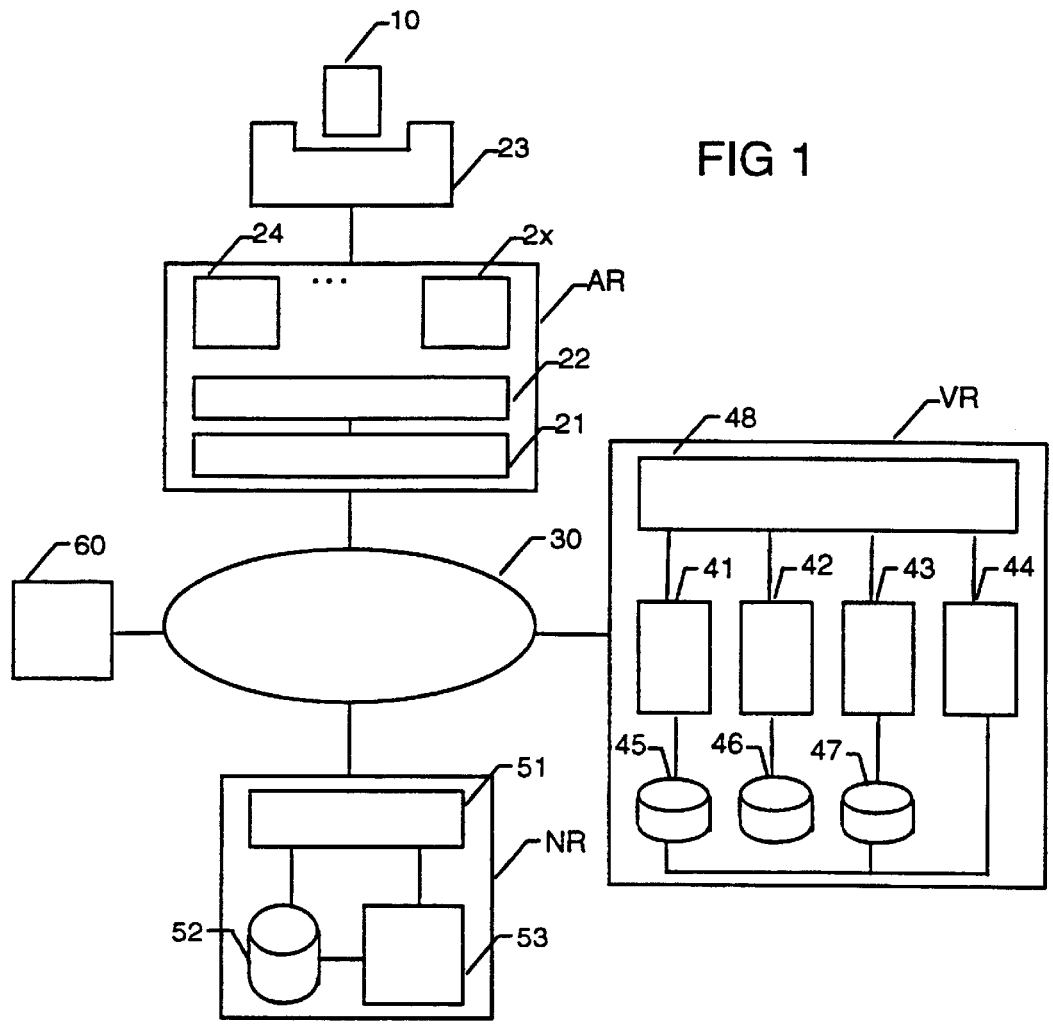
FIG. 1 is an overview diagram of the network components required for the implementation of the method of the invention.

FIG. 1 shows a network having, for example, one of a plurality of work station computers AR that is employed for using software loaded from the network, a chip card 10 that a user employs for authentification and for documenting corresponding software usage authorizations, a central administration computer VR on which all software objects and software usage authorizations are administered, and an arbitrary network computer NR on which software objects that can be loaded onto the work station computers AR on demand are stored. The computers are connected to one another via a standard data communication network 30, expediently via an Internet or Intranet. An administration computer VR and a network computer NR are in fact shown logically separated; however, they can be installed on the same hardware platform.

The administration computer VR contains, for example, a software administration program 41, referred to below as SOA program, a program for acquiring the software usage data 42, referred to below as SUC program, a program for administration of the software usage rights of all users in the network 43, referred to below as USAR program, and a program for issuing certificates for the purpose of software usage 44, referred to below as ISC program.

The SOA program 41 can be based on existing products, for example SMS of Microsoft, that, however, must be potentially expanded. It administers a data bank 45 of the software objects available in the network. Relevant information and properties of the individual objects, for example manufacturers, version number, size, location in the network, copying protection, etc., are maintained in the software object data bank. A register identifier is kept in this or in a separate data bank per object, this register identifier indicating the role in the concern which are allowed to have access to the respective software object. Typical roles in the concern can, for example, be: software engineer, marketing director, executive manager. The content of the software object data bank can, for example, be undertaken according to the specification of the security model of Microsoft.

The SUC program 42 dynamically maintains the software usage data in a data bank 46, i.e. the current status of the software used at all work station computers AR. Current data can be interrogated here at any time.

The relevant roles as well as the allocation to all users in the network are defined and administered in a data bank 47 with the USAR program 43. One or more roles can be assigned to each user. The plurality of roles can be arbitrarily expanded.

The ISC program 44 makes what are referred to as "user software certificates" USC available to the users on demand, these granting the authorization for usage of software. The ISC program 44 requires access to the data banks 47 and 45 for issuing the certificates USC.

The communication between the administration computer VR and the work station computers expediently ensues via a WWW-compatible server 48, for example Microsoft Internet information server or Netscape's Internet server. The programs 41, 42, 43 and 44 can, for example, be linked as back-end applications via what are referred to as SGI scripts.

The administer interface for the administration of the SOA and USAR programs 41 and 43 or, respectively, the search interface for the SUC program 42 can, for example, be an arbitrary browser 60 localized in the network.

A further browser 21 that sequences the communication with the computers VR and NR is expediently installed on the work station computer AR. The software component 22, referred to below as SCV program, is expediently transmitted from the administration computer VR to the work station computer AR given every request of the work station computer AR for allocation of software usage rights, being transmitted together with what is referred to as an HTML page, expediently with protocol HTTPS, for example as activeX control or as "plug in". As a list ASL, the HTML page displays the allowed access possibilities to network software at the picture screen.

Given a download request, the SCV program verifies the usage authorization with the certificates USC. The SCV program, further, controls the acquisition of the software usage data, for example number of downloads, usage time of ASW, etc.

The programs 24 through 2x are, for example, application programs that the user has loaded from the network and applied.

The chip card 10 is operated via a standard chip card reader 23 connected to the work station computer AR. The card correspondingly meets Standard 7816. A chip card having crypto-controller such as, for example, SLE 44CR80S of Siemens, is more advantageous since this is especially suited for open networks such as, for example, the Internet with security mechanisms operating on the basis of a public key.

Chip card applications and chip card readers can, for example, be supported in the work station computer AR in conformity with the specification and interfaces defined by the "PC/SC work group". Further information regarding this can be found under the address http://www.smartcardsys.com.

Figure 2:
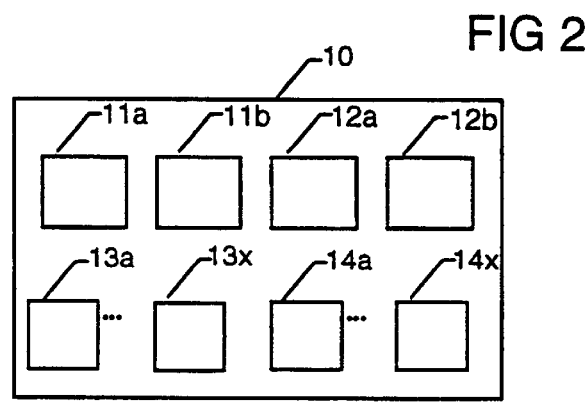
FIG. 2 is a schematic illustration of a chip card loaded with various keys and programs.

Each user at the network receives an individual chip card. The chip card is personalized with personal data of the user before being delivered to the user, namely in what is referred to as a personalization process, for example by a card manufacturer. As shown in FIG. 2, a private key 11a and a certificate of the public key 11b of the user must at least be stored on the card (personalized). The private key and the certificate of the public key of the user are generated, for example, in a trust center and are made available to the personalization location on a secure path, these then being stored on the chip card in standard procedures.

A both-sided and secure client/server authentification can be implemented according to currently standard methods, for example SSL V3.0, with this key certificate pair 11a/11b and a corresponding pair on the administration computer VR. This is the prerequisite for the secure transmission of certificates USC that the user requires for using software.

Dependent on the security demands, further key certificate pairs 12a/12b—for example for integrity protection of certificates USC or the secure communication between programs on the administration compute VR and the work station computer AR or for reloading keys or applications onto the card via the network—can be personalized onto the chip card or, respectively, can be loaded onto the chip card subsequently during network operation with secure methods.

Application programs 13a through 13x are already loaded onto the chip card in the personalization or likewise during network operation, these serving for the acquisition of the software use, for example the number of downloads or for acquiring time.

Figure 3:
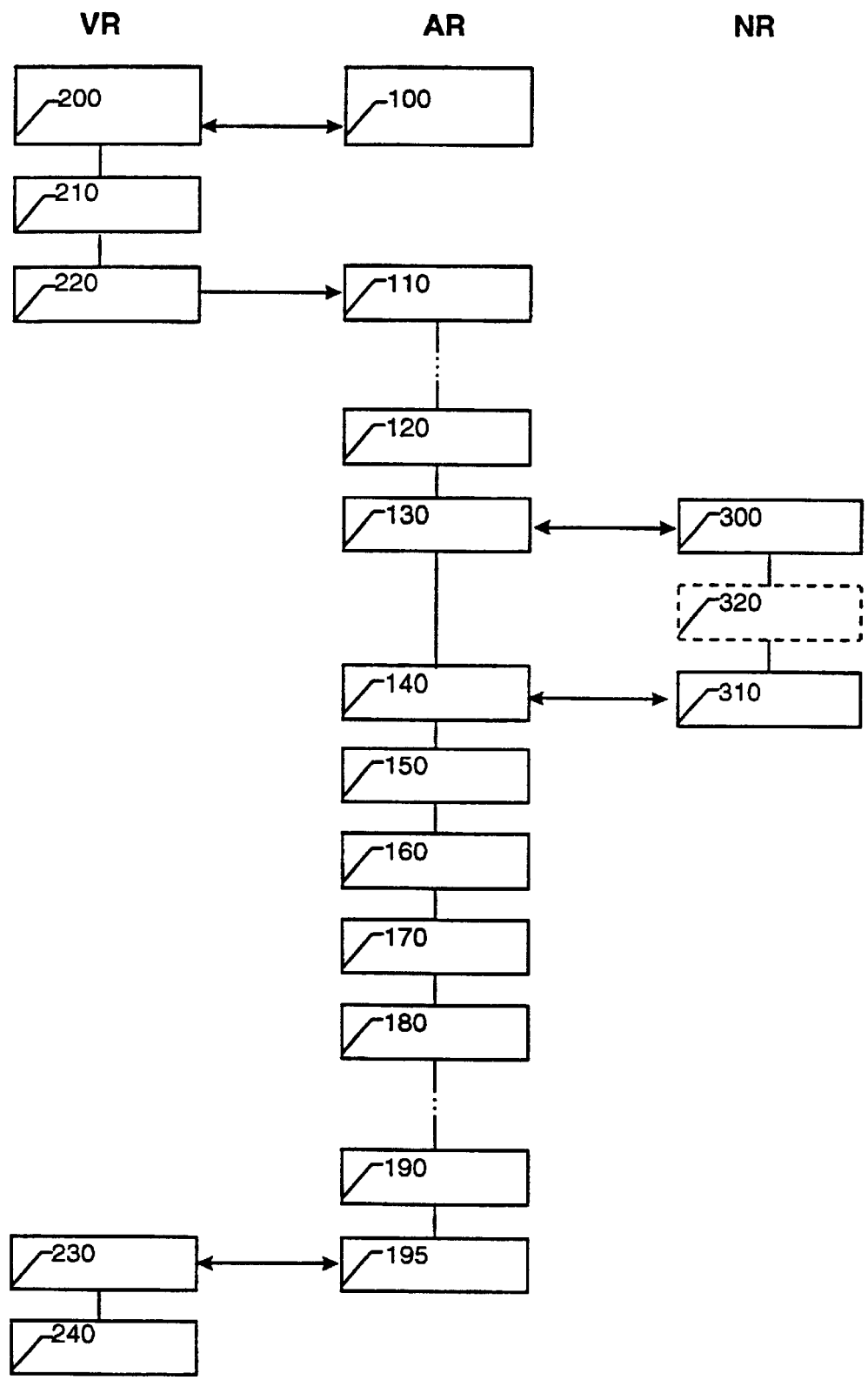
FIG. 3 is a flowchart of the method according to the invention.

The method of the software download, of the software usage and of the usage acquisition is explained with reference to FIG. 3. The following method steps are thereby implemented:

100: the user logs on at the administration computer VR and authenticates himself with the standard HTTPS protocol in the SSL dialog upon employment of his private key on the chip card.

200: The administration computer VR likewise authenticates itself and identifies the user.

210: The administration computer VR prepares the contents of the user-specific certificates USC upon interpretation of the data banks 45 and 47. Certificates are thereby produced for those software objects whose role identifiers agree with one or more roles that the user has.

For example, a certificate USC can contain: software ID, version number, location in network, size of the software object, type of usage acquisition, time interval of the acquisition message to the VR, delete mode, validity duration of the USC, ID of the issuing administration computer VR.

The following parameters, for example, can be utilized in the type of usage acquisition: acquisition of the download plurality, acquisition of the active usage time, no acquisition.

220: The prepared certificates USC are transmitted to the work station computer AR integrity-protected with the public key of the user in the administration computer VR, potentially also additionally encrypted with methods standard in the Internet and linked into the HTML page ASL together with the SCV program 22. Since the SCV program implements security-relevant functions in the work station computer AR, it should be expediently provided with a digital signature of the administration computer VR.

110: The HTML page ASL appears on the picture screen in the work station computer AR. It shows the user all accessible software objects.

A validity duration is implicitly contained in the HTML page, the page together with the SCV program and the certificates USC destroying themselves after the expiration thereof. It is kept available in the browser for the duration of the validity and can be called every time the work station computer AR is turned on without communication with the administration computer VR. A verification of the digital signature can preferably ensue after every call of the SCV program in order to avoid or, respectively, detect manipulations.

120: The user can now click the software objects desired for download. As a result thereof, the SCV program is automatically started. The SCV program and the appertaining certificates USC are subsequently verified upon employment of the key located on the chip card.

130: After positive verification, the SCV program determines the network computer address (addresses) from the certificate (certificates) USC and sets up the WWW connection to the first network computer NR. (To further network computers NR as warranted after the end of the download).

130/300: The mutual authentification between work station computer AR and network computer NR ensues according to a standard method.

310/140: Subsequently, the program 51 can select the desired software object (objects) and send it (them) to the work station computer AR.

320: It can be meaningful for enhancing the security, particularly given application of the method in the Internet, to likewise undertake a verification of the certificates USC in the network computer NR with the program 53 according to standard methods. For example, the certificates USC are signed in the work station computer AR with the private key of the user and verified in the network computer NR with its public key. In this case, the enable of the requested software object from the object data bank 52 would only ensue after positive verification, as indicated with broken lines.

A further enhancement of the security can be achieved in that the software object to be transmitted is provided with a digital signature in the network computer NR and a verification ensues in the work station computer AR before use. A falsification of the object in the network transmission could thus be detected.

150: In the next step, the type of usage acquisition is determined at the work station computer AR by the SCV program 22 on the basis of the USC parameters and is correspondingly activated. For example, when the parameter "acquisition of the number of downloads" is set, an object-related counter application is activated on the chip card, for example 13a in FIG. 2, and the counter is incremented. Counting events on the chip are expediently implemented secured cryptographically in the ususal way.

160: After the download, the user recognizes with reference to the list ASL on the picture screen as to what software is locally present and can initiate the start by clicking.

170: When a corresponding USC parameter has been set, the usage time acquisition is thereby simultaneously triggered by the SCV, and the usage time is periodically acquired during the active usage in that the SCV program 22 increments an object-related time counter at the chip card, for example 13b in FIG. 2, from time to time (capable of parameterization).

180: After the end of the usage of a loaded software object on the work station computer AR, the SCV program 22 decides on the basis of the delete mode parameter as to whether the program is to be erased or stored in the work station compute AR.

190: A usage acquisition answer back to the VR is triggered either after expiration of the time interval parameter of a certificate USC or by expiration of a time interval in the SCV program 22. In case of the certificate triggering, only the object-related acquisition data belonging to the appertaining certificate USC are affected; in the SCV trigger case, the acquisition data of all certificates USC are affected. Correspondingly, the appertaining download counters and usage time counters are selected from the chip card 10.

195/230: After the standard, mutual authentification between work station computer AR and administration compute VR, the selected counter readings are transmitted to the administration computer VR.

240: The corresponding acquisition data are interpreted with the SUC program 42 in the administration computer VR and are entered into the data bank 46.

When the chip card is withdrawn, for example, a dialog box with the warning appears that the program will be erased after a specific time (capable of parameterization) if the card is not reintroduced.

Due to the central administration of the usage rights and usage acquisition parameters in the administration computer VR, the disclosed method enables a software distribution and utilization that is uniform network-wide and flexibly adaptable. Nonetheless, the user can modify individual parameters or determine them himself, if a corresponding USC parameter allows this degree of freedom. For example, the user himself can decide about the erasing or storing of a program after utilization.

If individual USC parameters are modified by the user, the originally integrity-protected certificate USC remains unmodified, as a result whereof it is assured that an integrity verification can be respectively, implemented given a renewed download.

The functionality can be expanded in that an automatic download is triggered by the SCV program 22 when a software object calls another software object during its run time, for example OLE technology, that is not available on the work station computer AR but whose identity can be identified in one of the certificates USC.

The user in a network can apply the method proceeding from arbitrary computers connected to the network when he can operate his respective, individual authorization and acquisition chip card at this computer. Given a change in computer, he must merely communicate with the administration computer VR before the first download of a software object in order to have the current rights granted according to the above-described method.

Given progressing chip card technology, the HTML page with the list ASL and the SCV program can be stored on a chip card and run. In this case, the communication with the VR is eliminated given a change in computer.

From the point of view of the user, the method can also be applied to different, mutually independent networks, for example Intranet for rights within ones own company, Extranet for computers in a collaborating company, Internet for rights for worldwide use. This can ensue with one in the same and with separate chip cards. Given employment of the same chip card, separate keys must be made available for the various administration computers VR.

An expansion of the method is also possible in that mechanisms for copying protection are introduced into the disclosed method. To this end, what is referred to as a "key file" is generated upon employment of the public key of the user for software objects that are to be protected against copying, the user receiving this "key file" after the download of the software object. The software object can only be used with this "key file" and upon employment of the private key of the user.

By defining a USC parameter "copy-protected" and expanding the functions of the SCV program for the required communication between work station computer AR and administration computer NR as well as work station computer AR in chip card 10 according to the method defined for the protection against copying, the copying protection can be simply integrated into the method explained here.

Moreover, multi-functional chip cards can be employed for the method, these being utilized, for example, for other network applications as well. A combination with applications for identification in the network is preferably meaningful. Such applications could, for example be: WWW client authentification vis-a-via an Internet server, WWW client identification given mail (for example S/MIME), WWW client identification for allowing access rights to network resources.

Given lower security demands, the method can generally also be applied without the employment of chip cards. The keys and counters located on the chip card can, for example, be maintained on a diskette as well (for example, encrypted with a password), and the operations implemented on the chip card could be assumed by the SCV program 22.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method of controlling a distribution and/or use of computer-based objects including data collections and/or computer programs, the computer-based objects being stored in a server computer and made available on demand at least temporarily for a use in a client computer interconnected to the server computer via a data network, comprising the steps of:

providing an user-specific access right indicator for granting a user an access right to a computer-based object depending on a user role; the user-specific access right indicator being digitally signed with a private signature key of an access rights administration entity;

upon a user request for the computer-based object, transmitting the user-specific access right indicator to the client computer;

sending a request to the server computer for a transmission of the computer-based object from the server computer to the client computer;

validating the user-specific access right indicator in the server computer by a public signature key of the access rights administration entity for checking authorization of the request for the transmission of the computer-based object to the client computer;

transmitting the computer-based object to the client computer after a successful validation of the user-specific access right indicator; and controlling access to the computer-based object in the client computer by a dedicated control program validating the user-specific access right indicator.

2. A method according to claim 1 wherein the control program resides in a data carrier and is at least partially implemented thereat.

3. A method according to claim 1, further comprising the step of: coupling the data carrier to arbitrary computers of the data network.

4. A method according to claim 1, further comprising the step of: checking whether requested software objects are already available on the computer and, given a positive result, initiating a local offering of the software object.

5. A method according to claim 1, further comprising the steps of: following transmission of the certificates, presenting a list of the software objects corresponding to the certificates on the picture screen of the requesting computer, and triggering the request for the respectively desired software object by the user.

6. A method according to claim 1, further comprising the step of: offering of the software objects with various computers in the network.

7. A method according to claim 1, further comprising the step of:

modifying control parameters contained in the certificates by the user without an existing integrity protection being lost.

8. A method according to claim 1, further comprising the step of:

automatically requesting a further program called as a software object during run time of a program and that is referenced in one of existing certificates, said further program being requested by a separate control program and subsequently transmitted to the computer making the request.

9. A method according to claim 1, wherein deletion of software objects automatically ensues at an end of their use.

10. A method according to claim 1, wherein the certificates contain particulars about a nature of the acquisition of the usage scope of the software objects transmitted to a requesting computer; and a separate control program controls the acquisition of the scope of usage on the basis of said particulars.

11. A method according to claim 10, wherein the scope of usage ensues by counting the transmitted software objects.

12. A method according to claim 10, wherein the disclosed above usage ensues by counting periodically recurring clock pulses.

13. A method according to claim 1, further comprising the step of:
   each administration instance in data networks having a plurality of independent administration instances for software objects producing usage certificates for the software objects belonging to its area of competence.

14. A method according to claim 1, wherein all connection set ups in the data network and transmissions ensue protected by keys.

15. A method according to claim 14, wherein the keys are contained on the data carrier.

16. A method according to claim 1, further comprising the step of:
   securing software objects subject to copying protection against copying by additional control parameters in the appertaining certificate and corresponding control functions in the separate control program.

* * * * *